(12) United States Patent
Garcia Crespo

(10) Patent No.: US 9,435,209 B2
(45) Date of Patent: Sep. 6, 2016

(54) TURBOMACHINE BLADE REINFORCEMENT

(71) Applicant: General Electric Company, Schenectady, NY (US)

(72) Inventor: Andres Jose Garcia Crespo, Greenville, SC (US)

(73) Assignee: General Electric Company, Schenectady, NY (US)

(*) Notice: Subject to any disclaimer, the term of this patent is extended or adjusted under 35 U.S.C. 154(b) by 890 days.

(21) Appl. No.: 13/660,989

(22) Filed: Oct. 25, 2012

(65) Prior Publication Data

US 2014/0119928 A1    May 1, 2014

(51) Int. Cl.
*F01D 5/14* (2006.01)
*F01D 5/28* (2006.01)

(52) U.S. Cl.
CPC ............... *F01D 5/147* (2013.01); *F01D 5/282* (2013.01); *F01D 5/284* (2013.01); *F05D 2260/941* (2013.01); *F05D 2300/6033* (2013.01); *F05D 2300/702* (2013.01); *Y02E 20/16* (2013.01); *Y02T 50/672* (2013.01); *Y10T 29/49337* (2015.01)

(58) Field of Classification Search
CPC ........ F01D 5/147; F01D 5/282; F01D 5/284; F05D 2300/6033; F05D 2300/6034; Y10T 29/49337
See application file for complete search history.

(56) References Cited

U.S. PATENT DOCUMENTS

| 5,279,892 A | 1/1994 | Baldwin et al. |
| 5,470,649 A | 11/1995 | Farley |
| 6,106,646 A | 8/2000 | Fairbanks |
| 6,617,013 B2 | 9/2003 | Morrison et al. |
| 7,549,840 B2 | 6/2009 | Subramanian et al. |
| 7,600,978 B2 | 10/2009 | Vance et al. |
| 2006/0120874 A1* | 6/2006 | Burke et al. ............. 416/229 R |
| 2010/0015394 A1 | 1/2010 | Morrison et al. |
| 2011/0027098 A1* | 2/2011 | Noe et al. ................ 416/241 B |

FOREIGN PATENT DOCUMENTS

| CN | 102383864 A | 3/2012 |
| EP | 2469026 A2 | 6/2012 |
| EP | 2716871 A2 | 4/2014 |
| WO | 2010/077401 A2 | 7/2010 |

OTHER PUBLICATIONS

The European Search Report and Opinion issued in connection with corresponding EP Application No. 13179919.9 on Oct. 7, 2014.
CN Office Action (No English Translation); Application No. CN201310371684.1; Dated Jan. 20, 2016; 9 pages.

* cited by examiner

*Primary Examiner* — Dwayne J White
*Assistant Examiner* — Juan G Flores
(74) *Attorney, Agent, or Firm* — Fletcher Yoder, P.C.

(57) ABSTRACT

Embodiments of the present disclosure include a system having a turbomachine blade segment including a blade and a mounting segment coupled to the blade, wherein the mounting segment has a plurality of reinforcement pins laterally extending at least partially through a neck of the mounting segment.

17 Claims, 3 Drawing Sheets

TURBOMACHINE BLADE REINFORCEMENT

STATEMENT REGARDING FEDERALLY SPONSORED RESEARCH & DEVELOPMENT

This invention was made with Government support under grant number DE-FC26-05NT42643-ARRA awarded by the Department of Energy. The Government has certain rights in the invention.

BACKGROUND OF THE INVENTION

The subject matter disclosed herein relates to turbomachines, and, more particularly, to mounting systems for attaching turbomachine blades to a turbomachine rotor.

Turbomachines include compressors and turbines, such as gas turbines, steam turbines, and hydro turbines. Generally, turbomachines include a rotor, which may be a shaft or drum, which support turbomachine blades. For example, the turbomachine blades may be attached to the rotor by a mounting segment, which mates with a slot in the rotor. Unfortunately, certain portions of the mounting segment may be susceptible to elevated stresses, which can cause premature wear and degradation.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbomachine blade segment having a blade and a mounting segment coupled to the blade, wherein the mounting segment has a plurality of reinforcement pins laterally extending at least partially through a neck of the mounting segment.

In a second embodiment, a system includes a turbomachine blade mounting segment having a plurality of layers laminated to one another to form a first dovetail portion of a dovetail joint and a plurality of reinforcement pins, wherein each of the plurality of reinforcement pins extends crosswise through at least two of the plurality of layers within a shank region of the turbomachine blade mounting segment.

In a third embodiment, a method includes laminating a plurality of layers to form a turbomachine blade mounting segment of a turbomachine blade, wherein each of the plurality of layers comprises a plurality of ceramic fibers distributed within a ceramic matrix material and disposing a plurality of reinforcement pins within a neck region of the turbomachine blade mounting segment, wherein the neck region comprises a region of the turbomachine blade mounting segment having a smallest thickness extending from a pressure side to a suction side of the turbomachine blade, each of the plurality of reinforcement pins extends through at least two of the plurality of layers, and none of the plurality of reinforcement pins extends through outer layers of the plurality of layers.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include an improved turbomachine blade mounting segment for coupling a turbomachine blade to a wheel or drum rotor of a turbomachine. More specifically, certain embodiments include a mounting segment portion of a turbomachine blade, where a neck or shank region of the mounting segment portion is reinforced with a plurality of reinforcement pins extending through a thickness of the neck region. As discussed in detail below, the turbomachine blades and mounting segments may be formed as a single piece from laminated layers of a composite material (e.g., a ceramic-based composite material). As the layers of the composite material are assembled and laminated with one another, reinforcement pins, which may also be made from a ceramic-based composite material, may be inserted into the layers in a generally crosswise (e.g., perpendicular) direction. That is, the reinforcement pins may puncture the layers through a thickness of a neck region of the mounting segment portion of the turbomachine blade as the layers are stacked and laminated together. Furthermore, the reinforcement pins may be placed in a staggered arrangement or configuration throughout the neck region of the mounting segment portion of the turbomachine blade. In this manner, the reinforcement pins may reinforce the neck region of the mounting segment portion, thereby increasing interlaminar peeling stress tolerances within the mounting segment portion of the turbomachine blade. While the embodiments disclosed below are described in the context of a turbine (e.g., steam, water, or gas turbine), it is important to note that the disclosed mounting segments (e.g., first dovetail portions of dovetail joints) may be used with other turbomachines, such as compressors or pumps.

Figure 1:
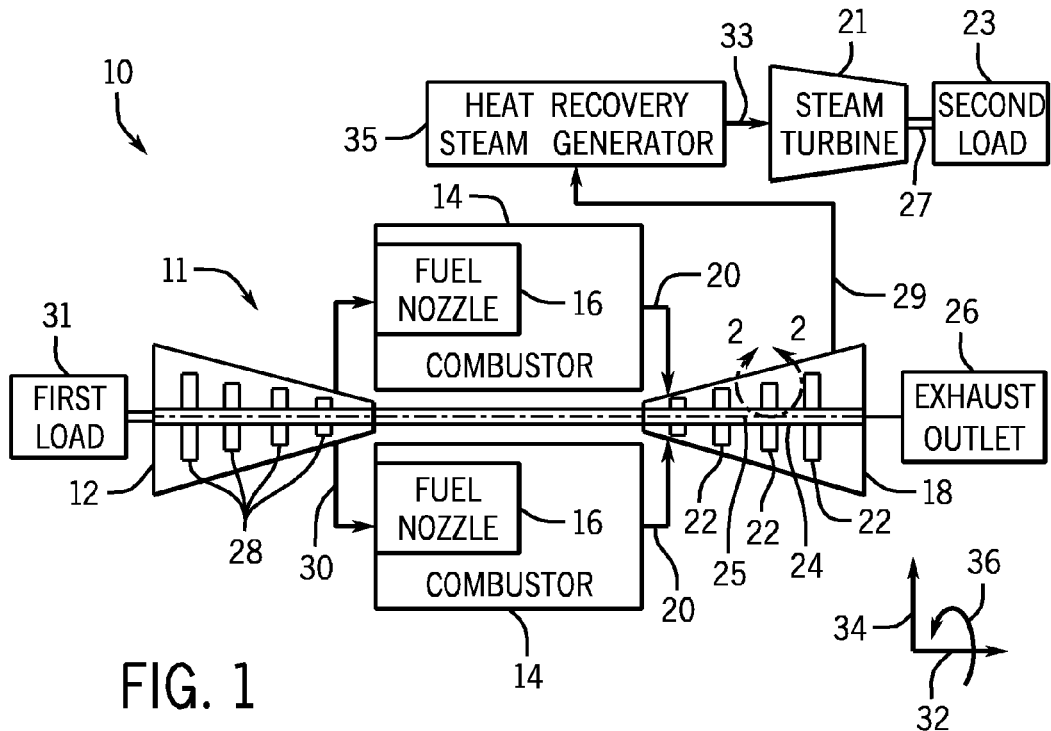
FIG. 1 is a schematic of an embodiment of a combined cycle power generation system having a gas turbine system, a steam turbine, and a heat recovery steam generation (HRSG) system.

Turning now to the drawings, FIG. 1 is a schematic block diagram of an embodiment of a combined cycle system 10 having various turbomachines that are equipped with improved blade mounting systems. Specifically, the turbomachines include turbomachine blades with improved mounting segments portions, which may be coupled to slots or recesses of a rotor. As shown, the combined cycle system 10 includes a gas turbine system 11 having a compressor 12, combustors 14 having fuel nozzles 16, and a gas turbine 18. The fuel nozzles 16 route a liquid fuel and/or gas fuel, such as natural gas or syngas, into the combustors 14. The combustors 14 ignite and combust a fuel-air mixture, and then pass hot pressurized combustion gases 20 (e.g., exhaust) into the gas turbine 18. The turbine blades 22 are coupled to a rotor 24, which is also coupled to several other components throughout the combined cycle system 10, as illustrated. For example, the turbine blades 22 may be coupled to the rotor 24 with improved mounting segments, as discussed below. As the combustion gases 20 pass through the turbine blades 22 in the gas turbine 18, the gas turbine 18 is driven into rotation, which causes the rotor 24 to rotate along a rotational axis 25. Eventually, the combustion gases 20 exit the gas turbine 18 via an exhaust outlet 26 (e.g., exhaust duct, exhaust stack, silencer, etc.).

In the illustrated embodiment, the compressor 12 includes compressor blades 28. The compressor blades 28 within the compressor 12 are also coupled to the rotor 24 (e.g., with improved mounting segments), and rotate as the rotor 24 is driven into rotation by the gas turbine 18, as described above. As the compressor blades 28 rotate within the compressor 12, the compressor blades 28 compress air from an air intake into pressurized air 30, which is routed to the combustors 14, the fuel nozzles 16, and other portions of the combined cycle system 10. The fuel nozzles 16 then mix the pressurized air 30 and fuel to produce a suitable fuel-air mixture, which combusts in the combustors 14 to generate the combustion gases 20 to drive the turbine 18. Further, the rotor 24 may be coupled to a first load 31, which may be powered via rotation of the rotor 24. For example, the first load 31 may be any suitable device that may generate power via the rotational output of the combined cycle system 10, such as a power generation plant or an external mechanical load. For instance, the first load 31 may include an electrical generator, a propeller of an airplane, and so forth.

The system 10 also includes a steam turbine 21 for driving a second load 23 (e.g., via rotation of a shaft 27). For example, the second load 23 may be an electrical generator for generating electrical power. However, both the first and second loads 31 and 23 may be other types of loads capable of being driven by the gas turbine system 11 and the steam turbine 21. In addition, although the gas turbine system 11 and the steam turbine 21 drive separate loads (e.g., first and second loads 31 and 23) in the illustrated embodiment, the gas turbine system 11 and steam turbine 23 may also be utilized in tandem to drive a single load via a single shaft.

The system 10 further includes the HRSG system 35. Heated exhaust gas 29 from the turbine 18 is transported into the HRSG system 35 to heat water to produce steam 33 used to power the steam turbine 21. As will be appreciated, the HRSG system 35 may include various economizers, condensers, evaporators, heaters, and so forth, to generate and heat the steam 33 used to power the steam turbine 21. The steam 33 produced by the HRSG system 35 passes through turbine blades of the steam turbine 21. As the steam 33 pass through the turbine blades in the steam turbine 21, the steam turbine 21 is driven into rotation, which causes the shaft 27 to rotate, thereby powering the second load 23.

In the following discussion, reference may be made to various directions or axes, such as an axial direction 32 along the axis 25, a radial direction 34 away from the axis 25, and a circumferential direction 36 around the axis 25 of the turbine 18. Additionally, as mentioned above, while the mounting segments described below may be used with any of a variety of turbomachines (e.g., compressors 12, gas turbines 18, or steam turbines 21) the following discussion describes improved mounting segments in the context of the turbine 18 (e.g., a gas turbine).

Figure 2:
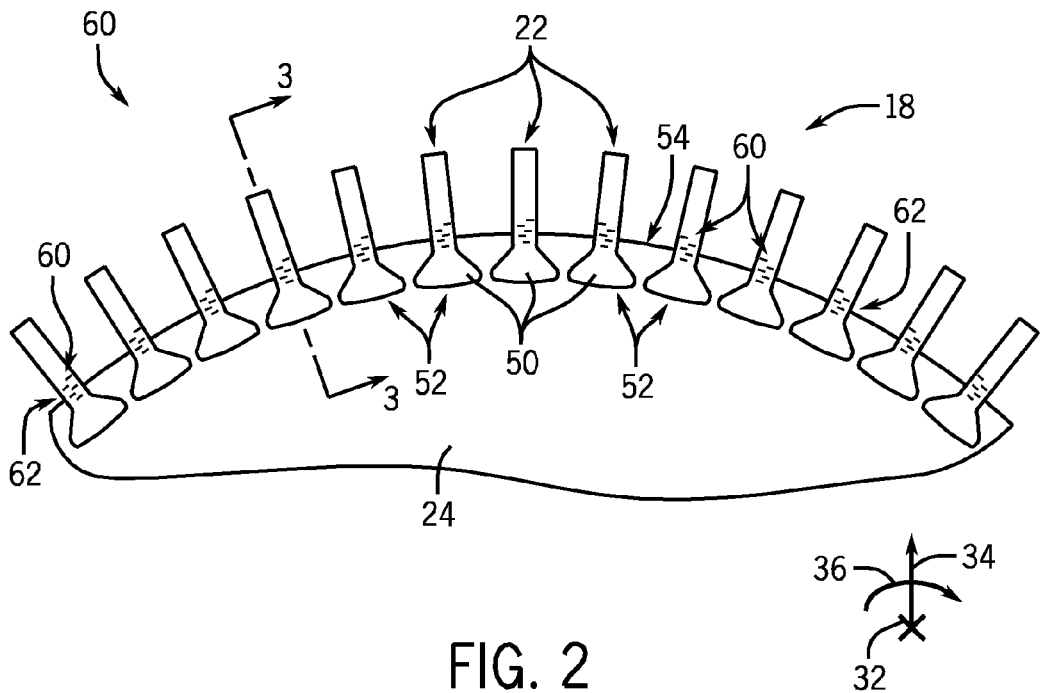
FIG. 2 is a partial cross-sectional axial view of a turbomachine, illustrating circumferentially mounted turbomachine blades having mounting segments, in accordance with embodiments of the present disclosure.

FIG. 2 is a partial cross-sectional axial view of an embodiment of the turbine 18 with the turbine blades 22 coupled to the rotor 24, illustrating mounting segment portions 50 of each respective turbine blade 22, which couple the respective turbine blades 22 to the rotor 24. For example, the mounting segment portion 50 (e.g., first dovetail portion or dovetail insert) of each turbine blade 22 may have a dovetail configuration or design configured to engage with a recess or slot 52 (e.g., an axial or a circumferential slot; second dovetail portion or dovetail slot) formed in an outer surface 54 of the rotor 24. For example, in one embodiment, the slot 52 may extend in the circumferential direction 36 completely around (e.g., encircling) the rotor 24. In another embodiment, the rotor 24 may include a plurality of axial slots 52 spaced apart from one another circumferentially about the rotor 24. The illustrated embodiment shows a single stage 60 of turbine blades 22 coupled to the rotor 24. As used herein, a "stage" of turbine blades 22 refers to those turbine blades 22 extending circumferentially 36 around the rotor 24 at a certain axial 32 location along the rotor 24. Additionally, as mentioned above, the mounting segment portions 50 in the illustrated embodiment are circumferentially 36 mounted in the slot 52. In other words, the slot 52 formed in the rotor 24 extends circumferentially 36 around the rotor 24. As will be appreciated, the mounting segment portion 50 of each respective turbine blade 22 may be coupled to the rotor 24 by inserting the mounting segment portion 50 into the slot 52.

In certain embodiments, the turbine blade 22 and its respective mounting segment portion 50 may form a single piece. Additionally, the turbine blade 22 and its respective mounting segment portion 50 may be formed from multiple laminated layers or plies. For example, the laminated layers or plies may be made from a composite material, such as a ceramic-based composite material. As will be appreciated, composite materials may be capable of withstanding higher temperatures and have greater longevities than metallic materials. Additionally, composite materials may require less cooling than metallic materials.

As discussed in detail below, the mounting segment portion 50 of each turbine blade 22 may include a plurality of reinforcement pins 60 arranged within a neck or shank region 52 of the mounting segment portion 50. Furthermore, the plurality of reinforcement pins 60 may extend at least partially through a thickness of the mounting segment portion 50. In other words, the plurality of reinforcement pins 60 may be arranged generally crosswise (e.g., perpendicular) to the layers or plies that are laminated to form the turbine blade 22 and its mounting segment portion 50. In certain embodiments, the plurality of reinforcement pins 60 may be made of a ceramic fiber. Indeed, the same ceramic fibers used to make the reinforcement pins 60 may be used to reinforce the individual layers of both the turbine blade 22 and respective mounting segment portion 50 in a radial direction. Moreover, as discussed below, the plurality of reinforcement pins 60 may be disposed in a staggered arrangement within the neck region 62 of the mounting segment portion 50.

Figure 3:
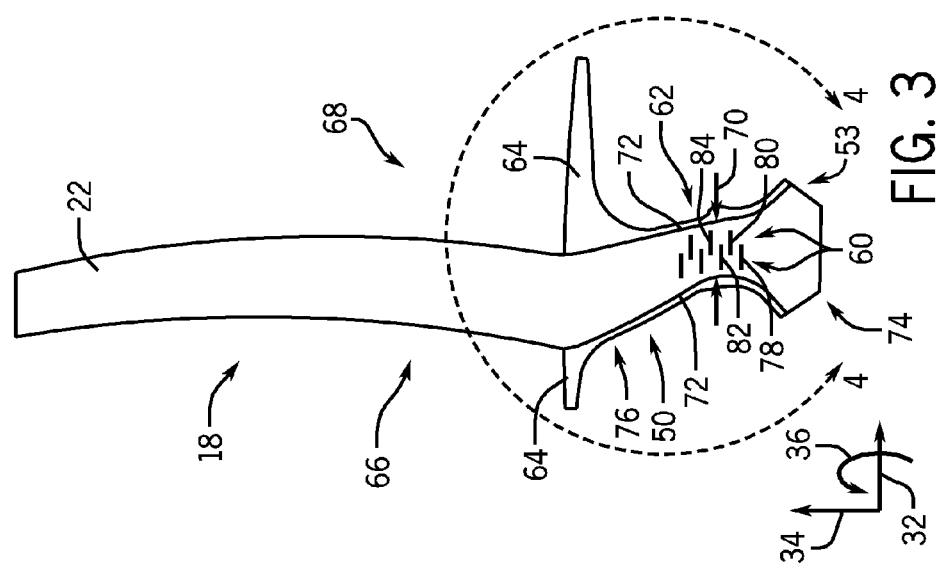
FIG. 3 is a cross-sectional circumferential view of a turbomachine, illustrating a circumferentially mounted turbomachine blade having a mounting segment, in accordance with embodiments of the present disclosure.

FIG. 3 is a cross-sectional circumferential view of an embodiment of the turbine 18, illustrating the turbine blade 22 and its mounting segment portion 50 having the plurality of reinforcement pins 60 disposed within the neck or shank region 62 of the mounting segment portion 50. As mentioned above, the mounting segment portion 50 (e.g., first dovetail portion or dovetail insert) of the turbine blade 22 may have a dovetail configuration and may be configured to be disposed within a slot or recess (e.g., second dovetail portion or dovetail slot shown in FIG. 2) of the rotor 24 of the turbine 18, thereby creating the dovetail joint 53. Additionally, one or more platform layers (e.g., outer plies) 64 may be disposed on opposite sides of the mounting segment portion 50 when the mounting segment portion 50 is positioned within the slot 52 of the rotor 24. That is, one platform layer 64 may be disposed on a pressure side 66 of the turbine blade 22, and one platform layer 64 may be disposed on a suction side 68 of the turbine blade 22.

As mentioned above, the neck region 62 of the mounting segment portion 50 includes reinforcement pins 60. Specifically, the reinforcement pins 60 extend laterally and at least partially through a thickness 70 of the neck region 62. As shown, the thickness 70 extends from the pressure side 66 to the suction side 68 of the mounting segment portion 50 of the turbine blade 22. In certain embodiments, the reinforcement pins 60 may be concentrated in an area of the mounting segment portion 50 with a reduced thickness 70, e.g., the smallest or most narrow (e.g., a minimum neck 62 section). In this manner, the reinforcement blades 60 may increase the strength and interlaminar tensile stress tolerance of the neck region 62 and the mounting segment portion 50 overall.

In the illustrated embodiment, the reinforcement pins 60 do not extend beyond outer surfaces 72 of the mounting segment portion 50. In other words, the reinforcement pins 60 do not pierce the outer surfaces 72 of the mounting segment portion 50 and contact the platform layers 64 abutting the mounting segment portion 50. As discussed in detail below, the reinforcement pins 60 may extend crosswise through one or more layers or plies that form the mounting segment portion 50 of the turbine blade 22. However, in the illustrated embodiment, the reinforcement pins 60 do not extend through the entire thickness 70 of the mounting segment portion 50. In certain embodiments, each reinforcement pin 60 may extend through approximately 5 to 95, 10 to 75, 15 to 55, or 20 to 35 percent of the thickness 70 of the mounting segment portion 50.

Furthermore, as noted above, the reinforcement pins 60 may be arranged within the neck region 62 in a staggered manner. For example, in the illustrated embodiment, the reinforcement pins 60 are staggered from a base 74 to a top 76 of the mounting segment portion 50 of the turbine blade 22. That is, adjacent reinforcement pins 60 alternate sides or positions (e.g., from the suction side 66 to the pressure side 68) within the neck region 62 of the mounting segment portion 50. As shown, each reinforcement pin 60 extends through approximately half the thickness 70 of the neck region 62. However, each reinforcement pin 60 may extend through multiple laminated layers that collectively form the mounting segment portion 50, as discussed with respect to FIG. 4 below. As the reinforcement pins 60 are staggered, a first reinforcement pin 78 is positioned toward the pressure side 66 of the mounting segment portion 50, and a second reinforcement pin 80, which is adjacent to the first reinforcement pin 78, is positioned toward the suction side 68. Similarly, a third reinforcement pin 82, which is adjacent to the second reinforcement pin 80, is positioned toward the pressure side 66, and a fourth reinforcement pin 84, which is adjacent to the third reinforcement pin 82, is positioned toward the suction side 68. As such, the reinforcement pins 60 have a staggered arrangement within the neck region 72 of the mounting segment portion 50. Additionally, the reinforcement pins 60 (e.g., adjacent reinforcement pins 60) at least partially overlap with one another. In this manner, better coverage of the neck region 62 by the reinforcement pins 60 may be achieved, while reducing cost and manufacturing difficulty.

As will be appreciated, the number of reinforcement pins 60 positioned within the neck region 72 of the mounting segment portion 50 may vary. For example, the neck region 72 of the mounting segment portion 50 may have 1 to 1000, 2 to 800, 3 to 600, 4 to 400, or more reinforcement pins 60. Additionally, as mentioned above, the reinforcement pins 60 may be made from a variety of materials. In certain embodiments, the reinforcement pins 60 may be made from the same or similar material as the turbine blade 22. For example, the reinforcement pins 60 may be made from a composite material, such as a ceramic-based composite material (e.g., a ceramic embedded with ceramic fibers).

Figure 4:
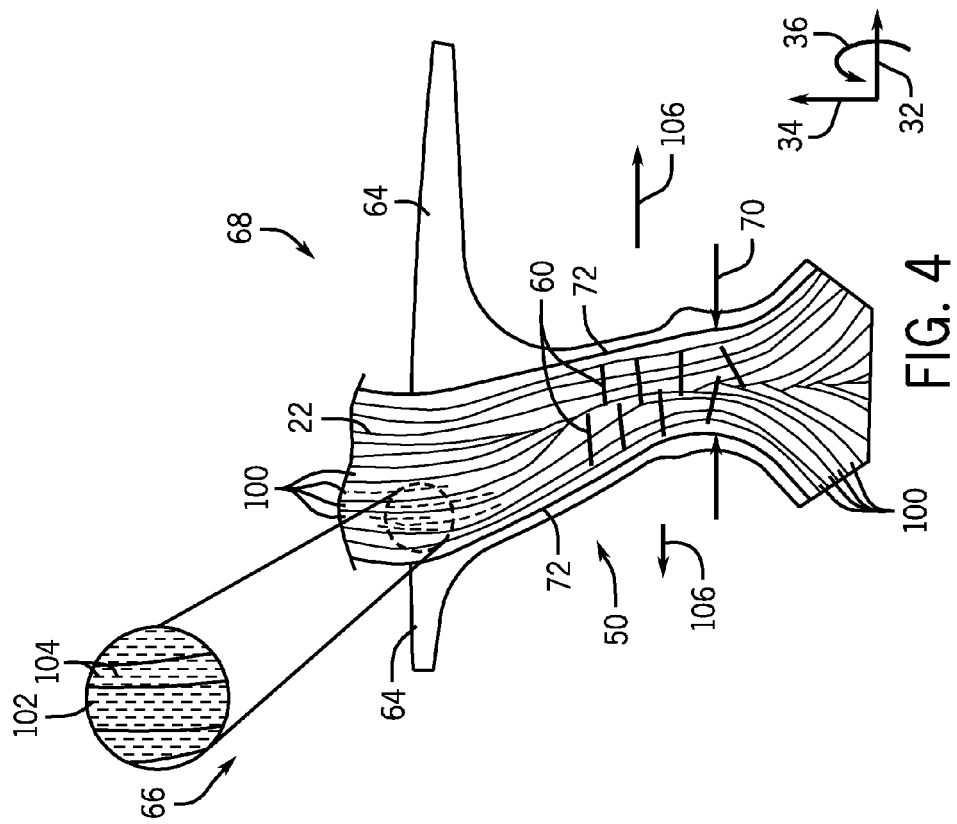
FIG. 4 is a partial cross-sectional circumferential view of a turbomachine, illustrating a circumferentially mounted turbomachine blade having a mounting segment, in accordance with embodiments of the present disclosure.

FIG. 4 is a partial cross-sectional circumferential view of an embodiment of the turbine 18, illustrating the turbine blade 22 and its mounting segment portion 50 having reinforcement pins 60 disposed within the neck region 62 of the mounting segment portion 50. As shown, the mounting segment portion 50 and the turbine blade 22 are formed from a plurality of laminated layers or plies 100. The layers 100 that form the turbine blade 22 and its mounting segment portion 50 may be made from a variety of materials, such as composite materials. In certain embodiments, the layers 100 may be made from a ceramic (e.g., a ceramic matrix material) 102 with ceramic fibers 104 embedded therein. The ceramic matrix material 102 and the ceramic fibers 104 may be the same material. However, the ceramic matrix material 102 and the ceramic fibers 104 may be made from different materials. As shown, the ceramic fibers 104 are oriented within the ceramic matrix material 102 generally in the direction of the respective layer 100.

The turbine blade 22 and its mounting segment portion 50 may have any number of layers 100. For example, the turbine blade and the mounting segment portion 50 may have 10 to 1000, 50 to 500, 100 to 400, or 200 to 300 layers 100. As mentioned above, the layers 100 may be laminated to form the turbine blade 22 and its mounting segment portion 50. That is, the layers 100 are oriented lengthwise along the blade 22 and mounting segment portion 50 (e.g., in the radial 34 direction). However, during operation of the turbine 18, the layers 100 of the mounting segment portion 50, particularly in the neck region 62, may experience interlaminar tensile stresses (e.g., in the directions 106). To help reduce the effects of the interlaminar tensile stresses (e.g., peeling stresses) and increase strength in the neck region 62, the mounting segment portion 50 includes the reinforcement pins 60. As mentioned above, the reinforcement pins 60 extend laterally (e.g., in an axial 32 or circumferential 36 direction) and at least partially through the thickness 70 of the neck region 62 of the mounting segment portion 50. Indeed, each reinforcement pin 60 extends through two or more layers 100 that form the neck region 62 of the mounting segment portion 50. However, as noted above, the reinforcement pins 60 do not extend beyond the outer surfaces 72 of the neck region 62 of the mounting segment portion 50. In other embodiments, the reinforcement pins 60 may be arranged in other crosswise patterns, such as a grid pattern, a crisscross pattern, and so forth.

Additionally, in a manner similar to that described above, the reinforcement pins 60 in the illustrated embodiment are arranged in a staggered manner within the neck region 62 of the mounting segment portion 50. Furthermore, adjacent staggered reinforcement pins 60 also at least partially overlap one another. For example, approximately 10 to 90, 20 to 70, or 30 to 50 percent of the length of each reinforcement pin 60 may overlap with adjacent staggered reinforcement pins 60.

The reinforcement pins 60 may be disposed laterally through multiple layers 100 using a variety of different manufacturing processes. For example, a number of initial layers 100 may be laminated to one another, and the reinforcement pins 60 may pierced or punctured into the initial layers 100 (e.g., in a direction lateral or perpendicular to the initial layers 100). Thereafter, additional layers 100 may be laminated onto the initial layers 100 and the reinforcement pins 60, thereby causing the reinforcement pins 60 to pierce the additional layers 100 as well. Periodically, more reinforcement pins 60 may be added as more additional layers 100 are added, thereby creating a staggered arrangement of reinforcement pins 60. As will be appreciated, the reinforcement pins 60 may be disposed perpendicular or lateral to the layers 100 of the neck region 62 in other manners as well.

Figure 5:
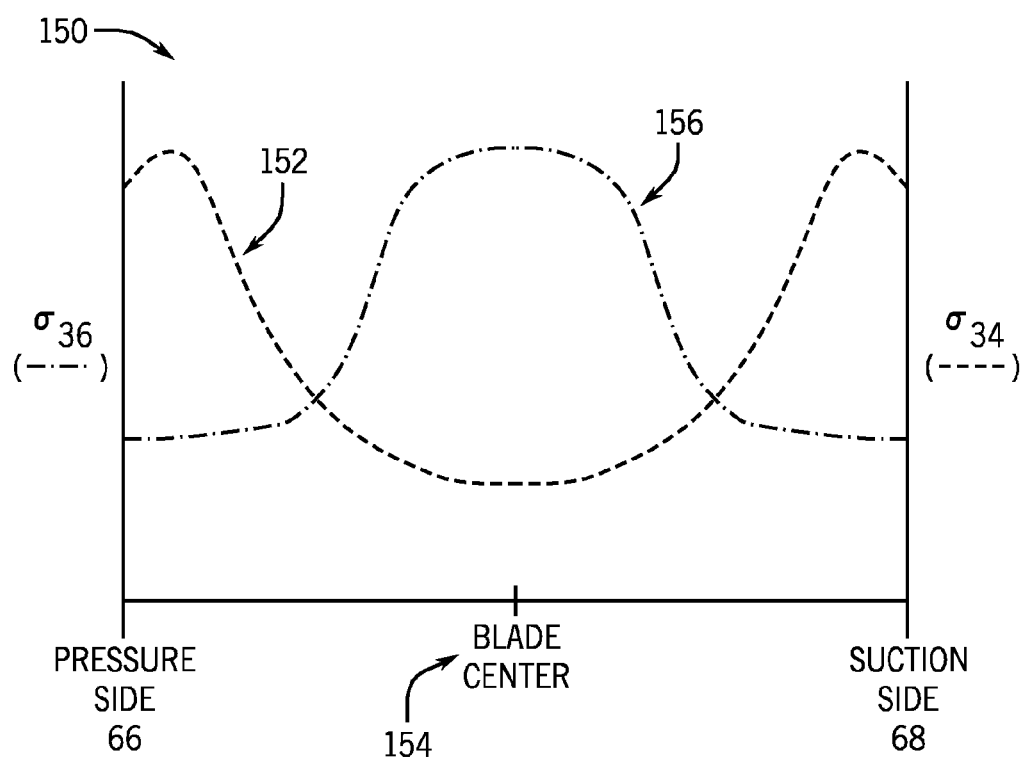
FIG. 5 is a graph illustrating radial and interlaminar stresses.

FIG. 5 is a graph 150 illustrating radial 34 and interlaminar (e.g., circumferential 36) stresses in the neck region 62 of the mounting segment portion 50 of the turbine blade 22. As indicated by the graph 150, a radial stress 152 of the mounting segment portion 50 is lowest at a blade center 154 of the turbine blade 22 (e.g., the midpoint of thickness 70 shown in FIG. 3). Additionally, an interlaminar stress 156 of the mounting segment portion 50 is highest at the blade center 154 of the turbine blade 22. Accordingly, as discussed in detail above, the reinforcement pins 60 are positioned where the interlaminar stress 156 is highest and the radial stress 152 is lowest (i.e., a blade center 154 or midway point of the thickness 70 of the neck region 62 of the mounting segment portion 50). Additionally, the reinforcement pins 60 may not be positioned at an outer edge or layer of the mounting segment portion 50 where the radial stress 152 is highest and the interlaminar stress 156 is lowest. Indeed, as discussed above, the reinforcement pins 60 may not puncture, pierce, or perforate the outer layers of the mounting segment portion 50. As the reinforcement pins 60 are positioned where the interlaminar stress 156 is greatest, the reinforcement pins 60 act to increase strength and stress tolerances within the mounting segment portion 50 of the turbine blade 22.

As discussed in detail above, disclosed embodiments are directed towards improved mounting segment portions 50 of turbomachine blades (e.g., turbine blades 22). For example, the neck or shank region 62 of the mounting segment portion 50 is reinforced with reinforcement pins 60 extending through the thickness 70 of the neck region 62. The turbine blades 22 and respective mounting segment portions 50 may be formed as a single piece from laminated layers 100, where each layer may be made of a composite material (e.g., a ceramic-based composite material). As the layers 100 of the composite material are assembled and laminated with one another, the reinforcement pins 60, which may also be made from a ceramic-based composite material, may be inserted into the layers 100 in a direction generally perpendicular to the layers 100 in the neck region 62 of the mounting segment portion 50 of the turbine blade 22. Furthermore, the reinforcement pins 60 may be placed in a staggered arrangement or configuration throughout the neck region 62 of the mounting segment portion 50 of the turbine blade 22. In this manner, the reinforcement pins 60 may reinforce the neck region 62 of the mounting segment portion 50, thereby increasing strength and interlaminar peeling stress tolerances within the mounting segment portion 50 of the turbine blade 22.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a turbomachine blade segment, comprising:
  a blade; and
  a mounting segment coupled to the blade, wherein the mounting segment has a plurality of reinforcement pins laterally extending at least partially through a neck of the mounting segment, wherein the neck of the mounting segment comprises a portion of the mounting segment that has a smallest thickness of the mounting segment, wherein the smallest thickness extends from a pressure side of the blade to a suction side of the mounting segment, wherein at least one of the plurality of pins extends laterally through the smallest thickness of the mounting segment, and wherein none of the plurality of reinforcement pins extends through an outer surface of the mounting segment.

2. The system of claim 1, wherein the turbomachine blade segment is formed from a plurality of laminated layers.

3. The system of claim 2, wherein each of the plurality of laminated layers comprises a composite material, wherein the composite material comprises a first plurality of ceramic fibers distributed throughout a ceramic matrix material, and wherein each of the first plurality of ceramic fibers extends along a length of the respective laminated layer.

4. The system of claim 3, wherein the plurality of reinforcement pins comprises a second plurality of ceramic fibers.

5. The system of claim 2, wherein each of the plurality of reinforcement pins extends through two or more of the plurality of laminated layers.

6. The system of claim 1, wherein the plurality of reinforcement pins has a staggered arrangement.

7. The system of claim 6, wherein each of the plurality of reinforcement pins at least partially overlaps with adjacent reinforcement pins.

8. The system of claim 1, comprising a turbomachine having a rotor, wherein the turbomachine blade segment is coupled to the rotor via the mounting segment.

9. The system of claim 8, wherein the turbomachine comprises a turbine.

10. A system, comprising:
a turbomachine blade mounting segment, comprising:
a plurality of layers laminated to one another to form a first portion of a dovetail joint; and
a plurality of reinforcement pins, wherein each of the plurality of reinforcement pins extends crosswise through at least two of the plurality of layers within a shank region of the turbomachine blade mounting segment, wherein the shank region of the turbomachine blade mounting segment comprises a portion of the turbomachine blade mounting segment having a smallest thickness extending between a suction side and a pressure side of the turbomachine blade mounting segment, at least one of the plurality of reinforcement pins extends crosswise through the smallest thickness, and none of the plurality of reinforcement pins extends through an outer layer of the plurality of layers.

11. The system of claim 10, wherein each of the plurality of layers comprises a plurality of ceramic fibers embedded within a ceramic matrix material, and each of the plurality of ceramic fibers extends along a length of the respective layer.

12. The system of claim 10, wherein each of the plurality of reinforcement pins comprises a ceramic fiber.

13. The system of claim 10, wherein the plurality of reinforcement pins are staggered, overlapping, crisscrossing, or a combination thereof.

14. The system of claim 10, comprising a turbomachine having a rotor with a second dovetail portion of the dovetail joint, and the turbomachine blade mounting segment is coupled to the rotor with the first and second dovetail portions mated together to define a dovetail joint.

15. A method, comprising:
laminating a plurality of layers to form a turbomachine blade mounting segment of a turbomachine blade, wherein each of the plurality of layers comprises a plurality of ceramic fibers distributed within a ceramic matrix material; and
disposing a plurality of reinforcement pins within a neck region of the turbomachine blade mounting segment, wherein the neck region comprises a region of the turbomachine blade mounting segment having a smallest thickness extending from a pressure side to a suction side of the turbomachine blade mounting segment, each of the plurality of reinforcement pins extends crosswise through at least two of the plurality of layers, at least one of the plurality of reinforcement pins extends through the smallest thickness, and none of the plurality of reinforcement pins extends through outer layers of the plurality of layers.

16. The method of claim 15, comprising arranging the plurality of reinforcement pins in a staggered pattern, an overlapping pattern, a crisscrossing pattern, or a combination thereof.

17. The system of claim 15, wherein each of the plurality of reinforcement pins comprises a ceramic fiber.

* * * * *